United States Patent [19]

Maulding

[11] 3,888,786

[45] June 10, 1975

[54] CHLORINATED BIS(PHENYLETHYNYL)ANTHRACENES AS FLUORESCERS IN CHEMILUMINESCENT SYSTEMS

[75] Inventor: Donald Roy Maulding, Branchburg Township, Somerset County, N.J.

[73] Assignee: American Cyanamid Company, Stamford, Conn.

[22] Filed: Nov. 23, 1973

[21] Appl. No.: 418,493

Related U.S. Application Data

[63] Continuation of Ser. No. 261,888, June 12, 1972, abandoned.

[52] U.S. Cl.................. 252/188.3 CL; 252/301.2 R
[51] Int. Cl............................................. C09k 3/00
[58] Field of Search............ 252/188.3 CL, 301.2 R

[56] References Cited

UNITED STATES PATENTS 3,399,137   8/1968   Rauhut et al............. 252/188.3 CL

*Primary Examiner*—Stephen J. Lechert, Jr.
*Attorney, Agent, or Firm*—Jordon L. Hart

[57] ABSTRACT

This invention relates to a chemiluminescent system to obtain chemiluminescent light by reacting an oxalic-type compound of the group consisting of an oxalic-type ester with a hydroperoxide compound in the presence of a solvent and chloro, fluoro, or lower alkyl bis phenylethynyl-substituted aromatic compound as a fluorescer.

10 Claims, No Drawings

CHLORINATED BIS(PHENYLETHYNYL)ANTHRACENES AS FLUORESCERS IN CHEMILUMINESCENT SYSTEMS

This is a continuation of application Ser. No. 261,888, filed June 12, 1972, now abandoned.

This invention relates to a novel chemiluminescent system and to a combination of ingredients which when reacted with a hydroperoxide obtain a quantum yield, a maximum intensity, and a total yield of chemiluminescent light which are of a significantly greater degree than chemiluminescent processes employing prior chemiluminescent compositions. By "chemiluminescent light" as referred to herein is meant electromagnetic radiation at wavelengths falling between about 330 m$\mu$ and about 850 m$\mu$.

The invention more particularly relates to the employment of particular fluorescent compounds, bis phenylethynyl aromatic hydrocarbons substituted by chloro, bromo, fluoro or lower alkyl groups in combination with specifically an oxalic-type compound to obtain chemiluminescent light.

In the earlier stages of chemiluminescence research the low efficiency and the low maximum intensity of light obtainable from even the best of the known chemiluminescent systems was of such a poor quality, i.e., such a small illumination, that the advantage or superiority of one fluorescent compound over other possible fluorescent compounds was not significant in terms of the illumination obtained by the use thereof. For example, the better fluorescent compounds differed from the poorer fluorescent compounds merely by a matter of about 3 or 4 units in quantum yield. Similarly, except to the extent that a chemiluminescent material was soluble in a diluent at least to the extent of obtaining chemiluminescent light upon the reaction with an appropriate peroxide compound, there was no recognition of any appreciable or significant superiority of any one particular solvent over other solvents known to be suitable in chemiluminescent systems in general. Even as some improvements developed in the chemiluminescent materials themselves, there still existed problems as to which solvents could be employed with particular chemiluminescent materials, and the fact that only by experimentation could it inconclusively be ascertained that certain combinations were compatible. Also, among the various fluorescent compounds known to be effective in chemiluminescent reaction, there became available conflicting evidence as to the probable superiority of one fluorescent compound over another. Additionally, the particular nature of the chemiluminescent agent to be employed, as well as the particular nature of the fluorescent compound to be employed, respectively each may vary in solubility in the particular solvent to be employed, thereby further complicating any effort to predict the superiority of any projected combination of chemiluminescent ingredients.

It is an object of this invention to obtain a chemiluminescent composition which obtains a higher quantum yield of light when admixed with a hydroperoxide.

Another object of this invention is to obtain a process for the production of chemiluminescent light at a higher quantum yield.

Another object of this invention is to obtain an article of manufacture suitable for storage of the chemiluminescent composition and/or employment with the chemiluminescent composition in a chemiluminescent reaction.

Another object is to provide a chemiluminescent composition or system having a fluorescent compound which may be used at a higher concentration.

Another object of this invention is to obtain a chemiluminescent composition which when admixed with a hydroperoxide obtains a higher maximum intensity of light.

Another object of this invention is to obtain a process which produces a chemiluminescent light of a higher maximum intensity.

Another object is to obtain a chemiluminescent composition which obtains a higher total light yield.

Another object is to obtain a process for the production of a higher total quantity of light.

These and other objects of my invention will become apparent as the description thereof proceeds.

The term "chemiluminescent composition," as used herein, means a mixture which will result in chemiluminescence.

A chemiluminescent reactant is any compound which enters into a chemical reaction whereby chemiluminescent light is obtained.

The term "chemiluminescent reaction component," as used herein, means a mixture which will result in a chemiluminescent reaction (1) when reacted with other necessary reactants in the processes as disclosed herein or (2) when brought into the proper physical environment.

The term "fluorescent compound," as used herein, means a compound which fluoresces in a chemiluminescent reaction, or a compound which produces a fluorescent compound in a chemiluminescent reaction.

The term "admixing," as used herein, means "reacting" or sufficiently bringing together component reactants to obtain a chemiluminescent reaction.

The term "hydrogen peroxide compound" includes (1) hydrogen peroxide and (2) hydrogen peroxide-producing compounds.

The term "hydroperoxide compound" as used herein is limited to peroxide compounds having at least one HOO— group, or a compound which upon reaction produces a compound with such a group.

The term "peroxide compound" as used herein, also includes compounds which upon reaction produce the peroxide group.

The term "diluent," as used herein, means a solvent or a vehicle which when employed with a solvent does not cause insolubility.

The objects of chemiluminescence have been obtained by the use of a new organic fluorescent compound in the reaction of a hydroperoxide with an oxalic-type ester as disclosed in U.S. Pat. No. 3,597,362 in a suitable solvent.

The general mechanism for the chemiluminescent reaction can be broken down into three steps.

(1) Luminant + Oxidant → Key Intermediate
(2) Key Intermediate + Fluorescer → Excited Singlet Fluroescer
(3) Excited Singlet Fluorescer → Fluorescer + Radiation In step (1) a chemiluminescent material undergoes reaction, usually with an oxidant, to produce what will be called a key intermediate. In step (2) the key intermediate undergoes a decomposition or other reaction which produces a fluorescent compound in a singlet excited state. In step (3) the excited singlet fluorescer emits radiation. The decomposition products are not shown. The exact nature of the key intermediate has not been determined. Theoretically, the fluorescent compound is only electronically excited by an energy transfer of the chemical energy released by the decomposition of the key intermediate and should not itself be decomposed. However, it has been found that fluorescent compounds actually undergo decomposition also in all known examples. Thus, since the fluorescer is necessary as the light emitter, when all of it has decomposed, no further illumination is possible even though decomposition of all of the key intermediate may not have occurred. Thus, it is essential for maximum utilization of all of the chemical energy from step (2) that sufficient fluorescer be present. This is, however, limited by the solubility of the fluorescer in the solvent system and the fluorescer stability. Although highly efficient fluorescers are known, a highly efficient fluorescer with high solubility and stability has not been found heretofore. Thus, the fluorescer has been the limiting factor in the chemiluminescent reaction described above, since it has not been possible to dissolve a sufficient amount of any highly efficient fluorescer in the system to utilize to the maximum possible the chemical energy released.

In U.S. Pat. No. 3,557,233 we disclosed that 9,10-bis(phenylethynyl)anthracene, and other phenylethynyl acenes had been found to be good fluorescers, more efficient than corresponding compounds without phenylethynyl substituents.

We have now unexpectedly found that the above objects are attained by the use of chloro, bromo or lower alkyl phenylethynyl-substituted aromatic compounds and that these compounds are highly efficient fluorescers which are highly soluble in the solvent system of the chemiluminescent reaction.

These compounds may therefore be present in a greater concentration and thus be present in sufficient amount to insure utilization to the maximum possible extent of the chemical energy released in the chemiluminescent process.

We have now unexpectedly found that bis phenylethynyl anthracene fluorescers which was believed to be the most efficient fluorescer can be made to emit with greatly improved efficiency by substitution with halo groups. Such fluorescers give improved performance and improved stability in chemiluminescent systems.

In the case of the present substituted bis(phenylethynyl)anthracene, a strong yellow fluorescence is obtained. Thus this is a very useful fluorescer for the chemiluminescent system.

The typical solvents employable as a necessary ingredient for a chemiluminescent process employing the chemiluminescent combination of this invention include the conventional simple-ester solvents such as dimethyl phthalate, dibutyl phthalate, ethyl acetate, octyl acetate, dimethyl adipate, triethyl phosphate, tricresyl phosphate, ether-ester solvents such as 2-methoxyethyl acetate, and the ether solvents such as 1,2-dimethoxyethane, ethylene carbonate, 1,2-dibutoxyethane (i.e. dibutylcellosolve), propylene carbonates, and dibutyl carbitol. Typical ether solvents include tetrahydrofuran, and dioxane. It should be noted that there are other solvents which are non-ether-ester which also may be employed; such as benzene, xylene, toluene, chlorobenzene, tetrachloroethane, fluorocarbons, polychlorinated polyphenyls and the like. Mixtures of these solvents may also be used. These specific examples are merely listed as illustrative specific compounds.

In addition to having greater solubility in the above solvents, the substituted phenylethynyl anthracene fluorescer compounds are also more economical than other highly efficient fluorescers. The combination of this invention employs an oxalic-type ester as the essential chemiluminescent ingredient of the novel combination of this invention, and accordingly the entire disclosure of U.S. Pat. No. 3,597,362, is hereby incorporated by reference. Therefore oxalic-type esters within the scope of this invention include ester of the following representative formula:

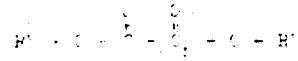

where $R^1$ or $R^{11}$ is an alkyl group such as hexafluoro-2-propylaryl substituents such as phenyl-, or naphthyl-for example, or substituted aryl groups such as chlorophenyl-, trifluoromethylphenyl-, formylphenyl-, nitrophenyl-, methoxyphenyl-, dinitrophenyl-, pyridylphenyl-, sulfophenyl-, heterocyclic groups such as pyridyl-, or substituted forms of heterocyclic groups such as methylpyridyl-, chloropyridyl-, acytoxypyridyl-, formylpyridyl-, carboxypyridyl-, methoxyfuryl-, dimethylaminotetrahydrofuryl-, sulfofuryl-, for example, and unsaturated alkyl groups such as vinyl-, for example.

The oxalic-type ester of this invention is preferably selected from the group consisting of (a) an ester of oxalic-type acid and an alcohol characterized by acid ionization constant in water greater than $1.3 \times 10^{-10}$, and (b) a vinyl ester of an oxalic-type acid. Similarly, in a preferred embodiment thereof, the alcohol would be an aromatic alcohol substituted by a substituent characterized by a positive Hammett sigma value. The preferred species of oxalic-type esters include bis(substituted-phenyl)oxalate such as bis-(2-nitrophenyl)oxalate, bis(2,4-dinitrophenyl)oxalate, bis-(2,6-dichloro-4-nitrophenyl)oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl)oxalate, bis(2,5-dinitrophenyl)oxalate, bis(2-formyl-4-nitrophenyl)oxalate, bis(pentachlorophenyl)oxalate, bis(1,2-dihydro-2-oxo-1-pyridyl)glyoxal, bis-N-phthalmidyl oxalate, bis(2,4,6-trichlorophenyl)oxalate and compounds of the foregoing type having carbalkoxy, e.g. carbobutoxy or carboalkoxy groups on the phenyl ring, such as bis(2,4,5,-trichloro-6-carbobutoxyphenyl)oxalate and bis(2,4,5,-trichloro-6-carbopentoxyphenyl)oxalate.

The peroxide employed in the compositions and process of this invention may be obtained from any suitable peroxide compound. For example, the peroxide may be employed as sodium peroxide. Alternatively, sodium perborate may be placed in aqueous solution whereby a solution of hydrogen peroxide is obtained. Obviously, hydrogen peroxide or its solution may be employed, and this is the preferred peroxide compound. The peroxide employed may be obtained from anhydrous hydrogen peroxide compounds such as perhydrate of urea (urea peroxide), perhydrate of pyrophosphate (sodium pyrophosphate peroxide), perhydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc., of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-2}$ molar. The ester of this invention may be added as a solid or in admixture with a suitable solid peroxide reactant or in a suitable diluent, or alternatively dissolved directly in a solution containing the peroxide reactant.

Typical diluents which additionally may be used in conjunction with the necessary diluent of this invention are those which do not readily react with a peroxide such as hydrogen peroxide, and which do not react with an ester of oxalic acid.

Although the addition of water is not necessary for the production of chemiluminescent light in certain embodiments according to the present invention water can serve as the diluent or partial diluent. The term "water," as used herein, includes water-producing compounds such as hydrate. In addition, however, either one or more diluents may be included with or in the place of water, as long as the peroxide employed is at least partially soluble in the combination of diluent(s), such as for example, at least one tenth gram of $H_2O_2$ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like.

Although it is only necessary to use phenylethynyl-type fluorescer compounds in the novel combination of this invention, other fluorescent compound may be employed therewith, if desired, for example to change the color of emission.

The compounds contemplated herein, which may, if desired, be employed in conjunction with the substituted phenylethynyl-type compound, may be defined broadly as those which do not readily react on contact with the peroxide employed in this invention, such as hydrogen peroxide; likewise, they do not readily react on contact with the ester of oxalic acid. Typical additional suitable fluorescent compounds for use in the present invention are those which have a spectral emission falling between 330 millimicrons and 850 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted pentacene, and the like. Typical substituents for all of these are phenyl, lower alkyl, chlorine, bromine, cyano, alkoxy $(C_1-C_{16})$, and other like substituents which do not interfere with the light-generating reaction contemplated herein.

It has been found that the molar (moles per liter of diluent) concentrations of the major components of the novel composition herein described may vary considerably. It is only necessary that components be in sufficient concentration to obtain chemiluminescence. The anhydride, amide or ester of oxalic acid molar concentration normally is in the range of at least about $10^{-7}$ to 5 molar, preferably in the range of at least $10^{-3}$ to about 1 molar; the fluorescent compound is present in the range from about $10^{-5}$ to 5, preferably $10^{-4}$ and $10^{-1}$ molar; and the water or other diluent must be present in a sufficient amount to form at least a partial solution of the reactants involved in the chemiluminescent reaction. Although there is no known maximum limit on the concentration of oxalate employed in the reaction, the reaction has been found to be more efficient within the indicated range. The ester may serve as either the sole diluent or a partial diluent.

The ingredients of the composition of this invention, may be admixed in a single stage of admixing or in a sequence of steps of admixing the separate ingredients.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the last conponent necessary to bring about the chemical reaction and the concurrent release of chemical energy.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Additionally, it has been found that the superior intensity of chemiluminescence is obtained when the final mixture producing the luminescence is maintained at a temperature of between about $-40°C$ and $75°C$, preferably between about $0°C$ and $50°C$. However, temperature is not critical and the luminescence of applicant's process is not limited to these ranges.

Additionally, the composition and the process which obtains preferred optimum chemiluminescent light intensity employs a base in an amount sufficient to produce a basic pH. However, the preferred extended lifetime is obtained under about neutral conditions. Any suitable base which does not interfere with the chemiluminescent composition and process of this invention may be employed.

A wide variety of organic and inorganic bases is contemplated, typical bases being: sodium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like; sodium salicylate and sodium benzoate being preferred bases.

While basic catalysts are generally preferred with oxalic esters and amides, acid catalysts are preferred specifically with the compounds of copending U.S. Ser. No. 547,782 filed May 5, 1966.

The lifetime and the intensity of the chemiluminescent light can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) Also, catalysts which alter the rate of reaction or the rate of chemiluminescence include those accelerators of copending application, Ser. No. 577,595, filed Sept. 7, 1966, and decelerators of copending application, Ser. No. 577,615, abandoned Sept. 13, 1967, cip filed June 26, 1967, as Ser. No. 648,932.

More specifically, the advantages obtained by the corporation of a catalyst of Ser. No. 577,595 may be obtained in conjunction with the objects of this present invention, by employing, according to the copending application, an ionized salt having a cation selected from (a) an organic quaternary cation selected from the group consisting of ammonium, arsenic, and phosphorous, and (b) alkali metal having an atomic weight above about 22, the salt of said cation preferably being soluble in an organic solvent and preferably being characterized by a property of forming cation-aggregates when reacted with the oxalic-type ester and a hydroperoxide. One of the advantages is the fact that an excessive amount of the chemiluminescent agent may be employed whereby a higher quantum yield may be obtained when the ionized salt is employed, in contrast to systems not employing the accelerator whereby such systems would be limited to a much lower maximum concentration of chemiluminescent agent which would continue to increase rather than decrease the total quantum yield of chemiluminescent light.

Similarly, within the scope of the present invention is the concurrent employment of one or more decelerators either alone in the composition of this invention, or in conjunction with one or more of the accelerators discussed in the proceding paragraphs. By employing one of the accelerators of the preceding paragraph, it would be possible to employ a greater total concentration of the chemiluminescent agent, while concurrently it would be possible to employ a decelerator which would prolong the period during which the light of high intensity is obtained from the chemiluminescent reaction. Such decelerators set forth in the copending application, Ser. No. 577,615, include for example a compound such as oxalic acid.

Additionally, the invention may include the use of a gelling agent to provide a chemiluminescent composition of self-supporting structure as disclosed in copending application, Ser. No. 577,594, filed Sep. 7, 1967.

In copending, commonly assigned patent application Ser. No. 124,142, filed Mar. 15, 1971, a high capacity chemiluminescent light system was disclosed, using as the oxalate carbalkoxy substituted chlorinated bisphenyl oxalates. e.g. bis(2,4,5-trichloro-6-carbobutoxy) oxalate with 9,10-bis(phenylethynyl anthracene) as the fluorescer. The greater efficiency of the present invention will be apparent from the following Specific Examples which are intended to be illustrative of the invention and not limitative.

EXAMPLE I

While the system described in Ser. No. 124,142 is far superior to other chemiluminescent systems, its maximum light output is limited to 250-300 lumen hours liter $^{-1}$, since the light capacity and quantum yield are decreased as the ester concentration is increased beyond 0.10 M. This loss in efficiency is shown by the data of the Example I summarized in Table I. Note that the light capacity of 147 lumen hours liter $^{-1}$ obtained at 0.30 M ester concentration is substantially lower than the 257 lumen hours liter $^{-1}$ for a 0.10 M CPPO system.

EXAMPLE II

It has been determined that the loss of chemiluminescence efficiency as the concentration of oxalate is increased, is partly due to the quenching of fluorescence by the unreacted oxalate. Thus by this process some of the energy available for light emission is lost by a radiationless process. To evaluate the extent of this loss the fluorescence efficiency of several fluorescers which have been used in oxalate chemiluminescence was determined at various oxalate concentrations. The results are shown in the tubular form (Table II) and indicate that 1-chloro,2-chloro, 1,5-dichloro-9,10-bis(phenylethynyl) (DCBPEA), 1,8-dichloro-9,10-bis(phenylethynyl) (DCBPEA), and 2,3-dichloro-9,10-bis(phenylethynyl) (DCBPEA) and 5,12-bis(phenylethynyl) (BPET) are far more resistant to CPPO fluorescence quenching. However, the chemiluminescence efficiencies with BPET at bis(2,4,5-trichloro-6-carbopentoxyphenyl)oxalate (CPPO) concentrations greater than 0.1 M are less than the efficiencies with BPEA, since the tetracene is destroyed in the chemiluminescent reaction.

The fluorescence quenching experiments in Table II indicate that methyl-9,10-bis(phenylethynyl) anthracenes are also unexpectedly resistant to fluorescence quenching by CPPO and are thus also superior fluorescers in oxalate ester chemiluminescence.

EXAMPLES III and IV

A comparison of CPPO chemiluminescence with BPEA and 1,5-DCBPEA is shown in Table III. As indicated by the emission intensities, even at 0.1 M oxalate more light is produced when 1,5-DCBPEA is used. The results also shown that the maximum light output is obtained at 1,5-DCBPEA concentration of $2 \times 10^{-3}$M. At higher CPPO concentrations the much greater light output with 1,5-DCBPEA is easily recognized. As indicated in experiment 6 of Table IV, a light of 462 1m hr $1^{-1}$ and quantum yield of 0.075 einsteins mole $^{-1}$ were obtained with 0.195 M CPPO and $1.8 \times 10^{-3}$ M 1,5-DCBPEA.

Table I

Effect of CPPO Concentration on Chemiluminescence Efficiency[a]

| CPPO M | Quantum Yield[b] | Light Capacity[c] | Intensity (ft. lmbt. cm$^{-1}$ vs. time) | | | | | |
|---|---|---|---|---|---|---|---|---|
| | | | 2 min. | 10 min. | 30 min. | 60 min. | 120 min. | 180 min. |
| 0.010 | 10.1 | 29 | 11.6 | 14.7 | 7.0 | 0.4 | .01 | — |
| 0.100 | 9.1 | 257 | 20.5 | 16.0 | 12.6 | 7.9 | 4.3 | 2.5 |
| 0.200 | 3.9 | 220 | 18.2 | 14.3 | 10.4 | 6.9 | 3.8 | 1.8 |
| 0.300 | 1.7 | 147 | 12.8 | 11.9 | 9.2 | 5.3 | 1.8 | 0.7 |

[a]Reaction in 75% dibutyl phthalate, 20% dimethyl phthalate, 5% tert-butanol, 2.25 × 10$^{-2}$ M bis phenylethynylanthracene (BPEA), 0.375 M H$_2$O$_2$, and 2 × 10$^{-4}$ sodium salicylate. CPPO is bis(2,4,5-trichloro-6-carbopentoxyphenyl)oxalate
[b]Chemiluminescence quantum yield in einsteins mole$^{-1}$ × 10
[c]Integrated light capacity in lumen hours liter$^{-1}$

TABLE II

CPPO Quenching of Fluorescence of Anthracenes and Tetracenes[a]

| Anthracenes | Fluorescence Quantum Yield | Fluorescence Quantum Yield at Various CPPO[b] Concentration(M) | | | | Fo/F Values[c] | | | |
|---|---|---|---|---|---|---|---|---|---|
| | | 0.05M | 0.10M | 0.20M | 0.25M | 0.05M | 0.10M | 0.20M | 0.25M |
| 9,10-diphenyl (DPA) | 0.738 | 0.536 | 0.494 | 0.352 | 0.349 | 1.38 | 1.49 | 2.10 | 2.12 |
| 9,10-bis(phenylethynyl) (BPEA) | 0.847 | 0.678 | 0.594 | 0.502 | 0.464 | 1.19 | 1.31 | 1.69 | 1.83 |
| 1-methoxy-9,10-bis(phenylethynyl) (MBPEA) | 0.979 | 0.803 | 0.701 | 0.552 | 0.507 | 1.20 | 1.38 | 1.76 | 1.94 |
| 2-methyl-9,10-bis(phenylethynyl) (MEBPEA) | 0.872 | 0.793 | 0.688 | 0.624 | 0.607 | 1.10 | 1.27 | 1.40 | 1.44 |
| 1,5-dichloro-9,10-bis(phenylethynyl) (DCBPEA) | 0.973 | 0.926 | 0.937 | 0.914 | 0.909 | 1.04 | 1.05 | 1.06 | 1.07 |
| 1,8-DCBPEA | 1.00 | 0.991 | 0.902 | 0.913 | 0.866 | 1.15 | 1.10 | 1.11 | 1.01 |
| 2,3-DCBPEA | 0.94 | 0.899 | 0.866 | 0.868 | 0.907 | 1.04 | 1.08 | 1.09 | 1.05 |
| 1-Cl-BPEA | .710 | 0.670 | 0.640 | 0.582 | 0.559 | 1.06 | 1.11 | 1.22 | 1.27 |
| 2-Cl-BPEA | .665 | 0.616 | 0.578 | 0.511 | 0.485 | 1.08 | 1.15 | 1.30 | 1.37 |
| Tetracenes | | | | | | | | | |
| 5,6,11,12-tetraphenyl (rubrene) | 0.583 | 0.495 | 0.454 | 0.387 | 0.335 | 1.74 | 1.51 | 1.28 | 1.18 |
| 5,12-bis(phenylethynyl) (BPET) | 0.715 | 0.715 | 0.673 | 0.649 | 0.628 | 1.14 | 1.10 | 1.05 | 1.00 |

[a]Solutions contained 2.0 × 10$^{-4}$ M fluorescer in dibutyl phthalate, except 5 × 10$^{-4}$ M for 2,3-DCBPEA and 3 × 10$^{-4}$ M for 1-Cl-BPEA and 2-Cl-BPEA. Excitation wavelength was 407 nm for rubrene and 429 nm for all other fluorescers
[b]CPPO is bis(2,4,5-trichloro-6-carbopentoxyphenyl)oxalate
[c]F is the fluorescence quantum yield and Fo is the fluorescence quantum yield in the absence of CPPO

TABLE IV

Chemiluminescence of CPPO and 1,5-DCBPEA Systems[a]

| Exp. | Final Concentrations | | Intensity(ft.lbt.cm$^{-1}$)vs.Time(min) | | | | | | | | | | | Light Capacity lm hr l$^{-1}$ | Quantum Yield (ein mole$^{-1}$ × 10$^2$) |
|---|---|---|---|---|---|---|---|---|---|---|---|---|---|---|---|
| | CPPO(M) | DCBPEA (10$^{-3}$M) | 2 | 10 | 20 | 30 | 60 | 90 | 120 | 150 | 180 | 210 | 240 | | |
| 1[b] | 0.080 | 1.6 | 26 | 19 | 14 | 11 | 6.4 | 4.2 | 3.1 | 2.3 | 1.9 | 1.6 | 1.3 | 254 | 10.1 |
| 2 | 0.150 | 1.5 | 32 | 21 | 16 | 14 | 10 | 7.8 | 6.1 | 4.8 | 3.8 | 3.1 | 2.6 | 370 | 7.8 |
| 3 | 0.180 | 2.1 | 38 | 29 | 23 | 19 | 11 | 7.0 | 4.2 | 2.4 | 1.2 | — | — | 382 | 6.8 |
| 4[c] | 0.180 | 1.8 | 46 | 37 | 27 | 22 | 12 | 7.0 | 4.1 | 2.4 | 1.4 | 0.8 | 0.5 | 412 | 7.3 |
| 5 | 0.195 | 1.8 | 26 | 18 | 15 | 13 | 11 | 8.7 | 7.1 | 5.7 | 4.5 | 3.5 | 2.5 | 422 | 6.9 |
| 6[c] | 0.195 | 1.8 | 38 | 27 | 22 | 17 | 12 | 8.6 | 6.1 | 4.1 | 2.7 | 1.6 | 1.0 | 462 | 7.5 |

[a]Reactions were carried out in 75% dibutyl phthalate, 20% dimethyl phthalate and 5% t-butanol. Concentration of hydrogen peroxide was 0.375 M and concentration of sodium salicylate was 1.25 × 10$^{-3}$ M
[b]Sodium salicylate concentration was 1.0 × 10$^{-3}$ M
[c]Sodium salicylate concentration was 2.0 × 10$^{-3}$ M EXAMPLES V and VI In this Example, the efficiency of the inventive fluorescers was tested with a constant concentration of oxalate compound, while varying the concentration of fluorescer. The results are shown in Tables V and VI. In Table V the concentration of oxalate was maintained at 0.01 M and in Table VI, the concentration of oxalate was maintained at 0.21 M.

TABLE V

Effect of 1,8—DCBPEA Concentration on Chemiluminescence Efficiency[a] at 0.10 M CPPO[a]

| 1,8-D-CBPEA $M \times 10^3$ | Q.Y.[b] $\times 10^2$ | Lt. Cap.[c] | T.75[d] | \multicolumn{7}{c}{Intensity (Ft. Lmbt. cm$^{-1}$) vs. Time (min.)} |
|---|---|---|---|---|---|---|---|---|---|---|
| | | | | 2 | 10 | 30 | 60 | 120 | 180 | 240 |
| 7.94 | 13.13 | 385 | 146 | 37.8 | 28.0 | 16.9 | 7.9 | 3.5 | 2.3 | 1.9 |
| 6.80 | 12.73 | 358 | 126 | 43.0 | 32.3 | 19.1 | 8.9 | 3.9 | 2.8 | 2.1 |
| 5.67 | 15.33 | 438 | 410 | 47.7 | 34.6 | 20.3 | 9.0 | 4.0 | 2.6 | 2.2 |
| 4.53 | 14.32 | 414 | 603 | 44.7 | 33.3 | 18.8 | 8.3 | 3.7 | 2.3 | 1.8 |
| 3.40 | 14.38 | 429 | 302 | 50.1 | 38.6 | 20.1 | 8.7 | 3.9 | 2.7 | 1.9 |
| 2.27 | 10.88 | 329 | 120 | 46.0 | 34.0 | 17.8 | 7.4 | 3.1 | 1.8 | 1.4 |

[a]Chemiluminescent reactions contained 0.10 M bis(2,4,5-trichloro-6-carbopentoxyphenyl)oxalate(CPPO), 1.56 × 10$^{-3}$ M sodium salicylate, 0.375 M H$_2$O$_2$, and the indicated concentrations of 1,8-dichloro-9,10-bis(phenylethynyl)anthracene (1,8-DCBPEA) in a solvent of 75% dibutyl phthalate, 20% dimethyl phthalate, 5% t-butanol.
[b]Quantum yield in einsteins mole$^{-1}$.
[c]Light capacity in lumen hours liter$^{-1}$.
[d]Time (minutes) required for emission of 75% of the total amount of light.

TABLE VI

Effect of 1,8—DCBPEA Concentration on Chemiluminescence Efficiency[a] at 0.21 M CPPO

| 1,8-DCBPEA $M \times 10^3$ | Q.Y.[b] $\times 10^2$ | Lt. Cap.[c] | T.75[d] | \multicolumn{7}{c}{Intensity (Ft. Lbt. cm$^{-1}$) vs. Time (min.)} |
|---|---|---|---|---|---|---|---|---|---|---|
| | | | | 2 | 10 | 30 | 60 | 120 | 180 | 240 |
| 7.94 | 7.76 | 478 | 163 | 33.4 | 24.4 | 15.0 | 11.3 | 7.8 | 5.2 | 2.4 |
| 6.80 | 7.74 | 457 | 146 | 38.7 | 28.4 | 18.0 | 13.5 | 9.0 | 5.7 | 3.7 |
| 5.67 | 7.70 | 463 | 142 | 42.2 | 29.9 | 18.8 | 14.0 | 9.0 | 5.4 | 3.2 |
| 4.53 | 5.97 | 363 | 110 | 38.4 | 27.8 | 16.9 | 12.3 | 7.2 | 2.8 | 1.1 |
| 3.40 | 5.89 | 369 | 91 | 46.6 | 31.4 | 18.6 | 13.6 | 6.3 | 2.2 | 0.6 |
| 2.27 | 4.11 | 261 | 59 | 45.1 | 30.2 | 17.1 | 10.1 | 2.0 | 0.2 | 0.1 |

[a]Chemiluminescent reaction contained 0.21 M bis(2,4,5-trichloro-6-carbopentoxyphenyl) oxalate (CPPO), 1.56 × 10$^{-3}$ M sodium salicylate, 0.375 M H$_2$O$_2$, and the indicated concentration of 1,8-dichloro-9,10-bis(phenylethynyl)anthracene (1,8-DCBPEA) in a solvent of 75% dibutyl phthalate, 20% dimethyl phthalate, 5% t-butanol.
[b]Quantum yield in einsteins mole$^{-1}$.
[c]Light capacity in lumen hours liter$^{-1}$.
[d]Time (minutes) required for emission of 75% of the total amount of light.

EXAMPLE VII

Two mono-chloro substituted bis(phenylethynyl) anthracenes were tested in this Example. 2-Cl BPEA was tested at two concentrations of CPPO, viz. 0.10 and 0.21 M with the results being summarized in Table VII. Testing of 1-Cl BPEA at 0.01 M CPPO is summarized in Table VIII and at 0.21 M CPPO in Table IX.

Table VII

CHEMILUMINESCENT PERFORMANCE OF 2—Cl BPEA[a]

| 2—Cl BPEA M | CPPO M | NaSal $M \times 10^3$ | Lt. Cap. | Q.Y. $\times 10^2$ | T.75 | \multicolumn{7}{c}{Intensity (Ft. Lmbt. cm$^{-1}$) vs. Time (Minute)} |
|---|---|---|---|---|---|---|---|---|---|---|---|---|
| | | | | | | 2 | 10 | 30 | 60 | 90 | 120 | 180 | 240 |
| .005 | .10 | 1.56 | 448 | 14.9 | 118 | 31.3 | 28.4 | 24.9 | 16.6 | 10.4 | 6.2 | 2.9 | 1.6 |
| .005 | .10 | 1.56 | 457 | 15.2 | 116 | 33.3 | 28.9 | 25.2 | 16.9 | 10.5 | 5.3 | 2.9 | 1.6 |
| .007[b] | .10 | 1.56 | 431 | 14.2 | 106 | 30.3 | 26.3 | 24.7 | 17.4 | 10.9 | 6.4 | 2.6 | 1.3 |
| .007[b] | .10 | 1.56 | 421 | 13.9 | 104 | 30.4 | 26.5 | 24.2 | 17.1 | 10.8 | 6.2 | 2.6 | 1.3 |
| .005 | .21 | 5.0 | 703 | 11.0 | 106 | 71.0 | 61.4 | 37.9 | 22.0 | 14.8 | 9.7 | 4.7 | 2.5 |
| .005 | .21 | 5.0 | 682 | 10.6 | 111 | 70.5 | 59.0 | 35.9 | 21.1 | 14.3 | 8.4 | 4.7 | 2.5 |
| .007[b] | .21 | 5.0 | 686 | 10.7 | 108 | 63.0 | 54.6 | 35.8 | 23.0 | 16.3 | 10.9 | 4.7 | 2.1 |
| .007[b] | .21 | 5.0 | 730 | 11.4 | 112 | 60.3 | 57.4 | 38.0 | 24.0 | 17.0 | 11.5 | 5.3 | 2.6 |

[a]Chemiluminescent reactions contained 0.21 M bis(2,4,5-trichloro-6-carbopentoxyphenyl)oxalate (CPPO), 0.375 M H$_2$O$_2$, and the indicated concentrations of sodium salicylate (NaSal) and 2-chloro-9,10-bis(phenylethynyl)anthracene (2-Cl BPEA) in a solvent mixture of 75% dibutyl phthalate, 20% dimethyl phthalate and 5% t-butanol.
[b]On standing the fluorescer precipitated from the oxalate components corresponding to these reactions. Solutions were warmed to dissolve the fluorescer and cooled to room temperature before mixing with the activator component.

Table VIII

EFFECT OF 1—Cl BPEA CONCENTRATION ON CHEMILUMENESCENCE PERFORMANCE AT .10 M CCPO[a]

| Conc. 1-Cl BPEA M | Lt. Cap. | Q.Y. $\times 10^2$ | T.75 | \multicolumn{6}{c}{Intensity (Ft. Lmbt. cm$^{-1}$) vs. Time (minutes)} |
|---|---|---|---|---|---|---|---|---|---|
| | | | | 2 | 10 | 30 | 60 | 90 | 120 | 180 |
| .005 | 569 | 17.9 | 98 | 41.3 | 38.6 | 35.0 | 23.6 | 13.9 | 8.1 | 3.7 |
| .005 | 552 | 17.3 | 97 | 41.0 | 38.1 | 34.1 | 22.6 | 13.2 | 7.9 | 3.5 |
| .006 | 577 | 17.9 | 98 | 40.1 | 37.6 | 34.9 | 24.4 | 14.6 | 8.6 | 3.7 |
| .006 | 541 | 16.8 | 99 | 37.5 | 35.2 | 32.8 | 22.6 | 13.4 | 7.9 | 3.6 |

Table VIII—Continued

EFFECT OF 1—Cl BPEA CONCENTRATION ON CHEMILUMINESCENCE PERFORMANCE AT .10 M CCPO[a]

| Conc. 1-Cl BPEA M | Lt. Cap. | Q.Y. × 10² | T.75 | \multicolumn{7}{c}{Intensity (Ft. Lmbt. cm⁻¹) vs. Time (minutes)} |
|---|---|---|---|---|---|---|---|---|---|---|
| | | | | 2 | 10 | 30 | 60 | 90 | 120 | 180 |
| .007 | 574 | 18.0 | 99 | 39.4 | 36.3 | 34.7 | 25.3 | 15.1 | 8.9 | 3.8 |
| .007 | 523 | 16.5 | 97 | 37.6 | 34.5 | 32.3 | 22.7 | 13.2 | 7.8 | 3.4 |
| .008 | 535 | 16.8 | 101 | 34.2 | 32.6 | 31.7 | 23.5 | 14.4 | 8.5 | 3.5 |
| .008 | 532 | 16.4 | 98 | 34.4 | 32.0 | 31.5 | 23.2 | 14.1 | 8.1 | 3.3 |

[a]Chemiluminescent reactions contained 0.10 M bis(2,4,5-trichloro-6-carbopentoxyphenyl)oxalate (CPPO), .375 M $H_2O_2$, 1.56 × 10⁻⁴ M sodium salicylate and the indicated concentrations of 1-chloro-9,10-bis(phenylethynyl)anthracene (1-Cl BPEA) in a solvent mixture of 75% dibutyl phthalate, 20% dimethyl phthalate and 5% t-butanol.

Table IX

EFFECT OF FLUORESCER CONCENTRATION ON CHEMILUMINESCENT PERFORMANCE OF 1—Cl BPEA AT 0.21 M CPPO[a]

| Conc 1—Cl BPEA M | Lt. Cap. | Q.Y. × 10² | T.75 | \multicolumn{8}{c}{Intensity versus Time} |
|---|---|---|---|---|---|---|---|---|---|---|---|
| | | | | 2 | 10 | 30 | 60 | 90 | 120 | 180 | 240 |
| .005 | 840 | 12.9 | 81 | 89.0 | 81.4 | 53.7 | 29.1 | 16.0 | 9.1 | 3.8 | 2.0 |
| .005 | 819 | 12.6 | 72 | 88.5 | 79.2 | 51.8 | 28.3 | 16.4 | 8.9 | 3.7 | 2.2 |
| .007 | 920 | 14.4 | 92 | 85.0 | 78.9 | 56.0 | 33.3 | 19.9 | 11.6 | 4.8 | 2.5 |
| .007 | 884 | 13.9 | 91 | 84.0 | 75.9 | 53.9 | 32.2 | 19.0 | 11.2 | 4.6 | 2.4 |
| .008 | 883 | 13.9 | 98 | 79.5 | 72.2 | 51.3 | 31.5 | 19.6 | 11.4 | 4.6 | 2.4 |
| .008 | 966 | 13.7 | 107 | 81.0 | 69.4 | 46.8 | 29.8 | 19.8 | 12.9 | 5.7 | 2.8 |

[a]Chemiluminescent reactions contained 0.21 M bis(2,4,5-trichloro-6-carbopentoxyphenyl)oxalate, 0.375 M $H_2O_2$, 5 × 10⁻⁴ M sodium salicylate and the indicated concentrations of 1-chloro-9,10-bis(phenylethynyl)anthracene (1-Cl BPEA) in a solvent mixture of 75% dibutyl phthalate, 20% dimethyl phthalate and 5% t-butanol.

EXAMPLE VIII

In this Example, a number of fluorescers were compared at their optimum performance concentrations. It will be seen that the mono-chloro BPEA compounds perform very well in comparision to the previously known best fluorescer BPEA. The results are shown in Table X.

Table X

COMPARISON OF VARIOUS FLUORESCERS IN CHEMICAL LIGHT SYSTEMS CONTAINING 0.21M bis(2,4,5-trichloro-6-carbopentoxyphenyl)oxalate[a](CPPO)

| Fluorescer[b] | FLR. conc. (10³M) | NaSal conc. (10³M) | Lt.Cap. Lumen hr.l. | Q.Y. 10²ein. mole | \multicolumn{7}{c}{Superior Brightners(Ft.lbts cm⁻¹)As a fraction of time (min.)} |
|---|---|---|---|---|---|---|---|---|---|---|---|
| | | | | | 2 | 10 | 30 | 60 | 90 | 120 | 180 | 290 |
| BPEA | 2.25 | 5.0 | 248 | 3.91 | 56 | 44 | 16 | 4.9 | 2.0 | 1.0 | 0.4 | — |
| 1—Cl BPEA | 8.0 | 5.0 | 883 | 13.9 | 79 | 72 | 51 | 32 | 20 | 11 | 4.6 | 2.4 |
| 2—Cl BPEA | 5.0 | 5.0 | 682 | 10.6 | 71 | 59 | 36 | 21 | 14 | 9.4 | 4.7 | 2.5 |
| 1,8-di Cl BPEA | 7.9 | 1.56 | 188 | 7.8 | 33 | 24 | 15 | 11 | — | 7.8 | 5.2 | 2.4 |
| 1,5-di Cl BPEA | 1.8 | 2.00 | 462 | 7.5 | 38 | 27 | 17 | 12 | 8.6 | 6.1 | 2.7 | 1.0 |

[a]Chemiluminescent reactions contained .21 M CPPO, .375 M $H_2O_2$ and the indicated concentrations of sodium salicylate (NaSal) and fluorescer in a solvent mixture of 75% dibutyl phthalate, 20% dimethyl phthalate, 5% t-butanol.
[b]Fluorescers used: 9,10-bis(phenylethynyl)anthracene(BPEA), 1-chloro-9,10-bis(phenylethynyl)anthracene (1-Cl BPEA), 2-chloro-9,10-bis(phenylethynyl)anthracene (2-Cl BPEA), 1,8-dichloro-9,10-bis(phenylethynyl)anthracene (1,8-DCBPEA) and 1,5-dichloro-9,10-bis(phenylethynyl)anthracene (1,5-DCBPEA).

EXAMPLE IX

Preparation of 1-Fluoro-9,10-bis(phenylethynyl)anthracene

A mixture of 4.5 g 1-fluoro anthraquinone (0.02 mole), 1.04g lithium anide (0.045 mole) and 4.1g (0.04 mole) phenylacetylene were refluxed for 24 hours in 100 ml toluene. Neutralization with acetic acid and evaporation of the toluene under reduced pressure gave a tarry material which solidified on stirring with petroleum ether. The infra-red spectrum of this solid was in agreement with a mixture of the expected diol plus lithium acetate. This product was dissolved in 200 ml of dimethyl formamide and 18.0g stannous chloride dihydrate added. Stirring at room temperature was continued for 24 hours. The brown solid formed in the reaction was collected by filtration, washed with water and dried, yielding 6.2g (78 percent) crude 1-fluoro-9,10-bis(phenylethynyl)anthracene.

This material gave a green chemiluminescent emission on treatment with hydrogen peroxide in the presence of bis(2,4,5-trichloro-6-carbopentoxyphenyl)oxalate (CPPO). The color of the chemiluminescent emission was similar to that obtained from 9,10-bis(phenylethynyl)anthracene (BPEA) under comparable conditions.

EXAMPLE X

Preparation of: 1,4,5,8-tetrachloro-9,10-bis(phenylethynyl)anthracene

A slurry of 34.6g (0.1 mole) 1,4,5,8-tetrachloroanthraquinone and 30.6g (0.3 mole) of phenyl acetylene in 500 ml anhydrous dioxane was charged into a one liter creased (morton) flask. Lithium amide (6.9g, 0.3 mole) was added and the mixture heated to reflux. The initial slurry was yellow and turned brown, then grey as reflux continued. After 96 hours of reflux about 200 ml of solvent was distilled out. The cooled reaction was hydrolyzed with 400 ml of water containing 16.1g of NH₄Cl. A brown tar was separated from the hydrolysis mixture by decanting. Washing of the tar with hexane afforded a solid. Boiling of this solid was acetone resulted in an off-white solid which was collected by filtration, washed with acetone and dried, yielding 42.6g of crude 1,4,5,8-tetrachloro-9,10-bis (phenylethynyl)anthra-9,10-diol, m.p. 272°–276°C (dec.), 77 percent yield. Infra-red spectrum is in agreement with the desired product. The crude diol was crystallized from 1400 ml toluene, yielding 25.8g (61 percent) purified of material, m.p. 284°–286°C (dec., softening from 260°C).

A mixture of 1.0g (0.0044 mole) stannous chloride and 1.0g (0.0018g) 1,4,5,8-tetrachloro-9,10-bis(phenylethynyl)anthra9,10-diol was stirred in 50 ml of refluxing chloroform for 1 hour. Cooling and filtration gave a clear red-orange fluorescent solution. Addition of 100 ml of hexane precipitated a pale pink solid which was removed by filtration. Evaporation of the filtrate gave a red solid which was collected, washed with methanol and dried, yielding 0.20 g of crude 1,4,5,8-tetrachloro-9,10-bis(phenylethynyl)anthracene. Infrared spectrum was inconsistent with the structure of the desired product.

About 10 mg of product was dissolved in 7.5 ml of 0.133 M bis(2,4,5-trichloro-6-carbopentoxyphenyl)oxalate (CPPO) in dibutyl phthalate. Addition of 2.5 ml of 1.5 M $H_2O_2$ and 0.0005 M NaSal in a mixture of 80 percent dimethyl phthalate and 20 percent t-butanol gave a red-orange chemiluminescence.

I claim:

1. A chemiluminescent composition for reaction with a hydroperoxide to obtain chemiluminescent light, said composition comprising (1) an ester of the formula:

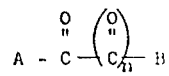

where A and B represent aliphatic or aromatic ester groups, and $n$ is an integer at least one, (2) a fluorescer comprising a bis(phenylethynyl)anthracene substituted by chloro, fluoro or lower alkyl, and (3) an organic solvent, said ingredients being present in sufficient concentration to obtain chemilinescence when reacted with hydrogen peroxide.

2. A composition according to claim 1, in which said chemiluminescent compound is a bis-ester of oxalic acid.

3. A composition according to claim 2 in which said ester comprises an ester formed from oxalic acid and a phenol, said phenol characterized by an ionization constant in water greater than $1.3 \times 10^{-10}$.

4. A composition according to claim 3 in which said bis(substituted-phenyl)oxalate comprises bis(2,4,5-trichloro-6-carbopentoxyphenyl)oxalate.

5. A composition according to claim 2 wherein said bis-phenyl ester is substituted with carbalkoxy groups.

6. A composition according to claim 2 wherein said fluorescer is a monochloro or a dichloro derivative of 9,10-bis-(phenylethynyl)anthracene.

7. A composition according to claim 6 wherein said fluorescer is selected from the group consisting of 1,5-dichloro-9,10-bis(phenylethynyl)anthracene; 1,8-dichloro-9,10-bis(phenylethynyl)anthracene; and 2,3-dichloro-9,10-bis(phenylethynyl)anthracene.

8. A composition according to claim 2 wherein said fluorescer is 2-methyl-9,10-bis(phenylethynyl)anthracene.

9. A composition according to claim 3 wherein said fluorescer is 1-chloro-9,10-bis(phenylethynyl)anthracene.

10. A composition according to claim 3 wherein said fluorescer is 2-chloro-9,10-bis(phenylethynyl)anthracene.

* * * * *

UNITED STATES PATENT AND TRADEMARK OFFICE
CERTIFICATE OF CORRECTION

PATENT NO. : 3,888,786
DATED : June 10, 1975
INVENTOR(S) : Donald Roy Maulding

It is certified that error appears in the above-identified patent and that said Letters Patent is hereby corrected as shown below:

In Column 1, insert the following statement as the second paragraph of the Specification:

--The invention herein described was made in the course of or under a contract (Contract No. N60921-70-C-0198) or sub-contract thereunder, (or grant) with the Department of the Navy.--

Signed and Sealed this

Eighteenth Day of September, 1990

Attest:

HARRY F. MANBECK, JR.

*Attesting Officer*       *Commissioner of Patents and Trademarks*